United States Patent
Fleck et al.

[11] 3,762,741
[45] Oct. 2, 1973

[54] OCCUPANT RESTRAINT CUSHION

[75] Inventors: Lawrence L. Fleck, Warren; Robert Hickling, Royal Oak, both of Mich.

[73] Assignee: General Motors Corporation, Detroit, Mich.

[22] Filed: Oct. 4, 1971

[21] Appl. No.: 186,326

[52] U.S. Cl. ........ 280/150 AB, 5/348 R, 137/525.1, 182/137
[51] Int. Cl. ............................................. B60r 21/08
[58] Field of Search ............. 280/150 AB; 5/348 R; 244/138 R, 138 P; 137/525, 525.1; 182/137

[56] References Cited
UNITED STATES PATENTS

| 3,675,942 | 7/1972 | Huber | 280/150 AB |
|---|---|---|---|
| 2,974,912 | 3/1961 | Namsick | 244/138 R |
| 2,741,780 | 4/1956 | Kimbrig | 5/348 R |
| 2,912,999 | 11/1959 | Kersh | 137/525 X |
| 2,919,747 | 1/1960 | Post | 5/348 R |
| 3,125,377 | 3/1964 | Bridges | 5/348 R X |
| 3,085,549 | 4/1963 | Kacsuta | 137/525 X |
| 3,118,468 | 1/1964 | Bochan | 137/525.1 X |
| 3,230,663 | 1/1966 | Shabram | 137/525.1 X |
| 3,650,223 | 3/1972 | Kobori | 280/150 AB |

*Primary Examiner*—Kenneth H. Betts
*Assistant Examiner*—John P. Silverstrim
*Attorney*—W. E. Finken et al.

[57] ABSTRACT

An occupant restraint cushion includes radially spaced inner and outer cylindrical walls. End partitions join the end edges of the inner and outer walls and cooperate with axially spaced intermediate partitions to divide the cylindrical space between the inner and outer walls into a plurality of side-by-side pressure fluid receiving chambers. The intermediate partitions are apertured for cross communication of the chambers. A generally cruciform shaped end wall extends across each end opening of the inner wall and has the arms thereof joined to the inner surface of the inner wall. Arcuate cutouts of the end walls open to the inner surface of the inner wall and define therewith ambient atmosphere induction inlets. A valve member of flexible material is provided for each inlet. The valve member has one end secured to the end wall adjacent a respective cutout and has the sides thereof secured to the inner surface of the inner wall to define therewith an ambient atmosphere induction passage. The end walls include pressure relief openings sealed by rupturable membranes. A manifold or diffuser extends between the inner and outer walls axially of the cushion and opens to each pressure fluid receiving chamber for inflation of such chambers and shaping of the cushion when the diffuser is connected with a pressure fluid source. The induction passages permit the introduction of ambient atmosphere into the interior of the inner wall when the pressure fluid chambers are inflated and remain open as long as there is no pressure differential. Upon occupant engagement with the cushion, the increase in pressure within the interior of the inner wall forces the valve members against the inner surface of the inner wall to close the induction passages. Ambient atmosphere escapes from within the interior of the inner wall when a predetermined pressure therewithin ruptures the membranes.

3 Claims, 4 Drawing Figures

PATENTED OCT 2 1973

INVENTORS.
Lawrence L. Fleck &
BY Robert Hickling
Herbert Furman
ATTORNEY

PATENTED OCT 2 1973

INVENTORS.
Lawrence L. Fleck &
BY Robert Hickling

Herbert Furman
ATTORNEY

OCCUPANT RESTRAINT CUSHION

This invention relates generally to inflatable vehicle body occupant restraint cushions and more particularly to such cushions which are inflated for occupant protection purposes by a combination of both pressure fluid and ambient air or atmosphere.

The cushion of this invention is related to that shown in copending application Ser. No. 142,537 Fleck et al., filed May 12, 1971 and assigned to the assignee of this invention.

One feature of the cushion of this invention is that it includes inner and outer inflatable cushions having a common wall and respectively inflated by ambient atmosphere and pressure fluid, one of the cushions being divided into a plurality of adjacent communicable chambers reinforcing each other. Another feature is that the inner cushion is freely communicable with the ambient atmosphere for inflation thereby when the outer cushion is inflated by pressure fluid. A further feature is that the adjacent pressure fluid receiving chambers communicate with a common manifold for simultaneous inflation. Yet another feature is that the inner cushion communicates with the ambient atmosphere through induction valves which are normally open and close when the pressure within the inner cushion is greater than ambient pressure.

These and other features of the cushion of this invention will be readily apparent from the following specification and drawings wherein.

Figure 1:
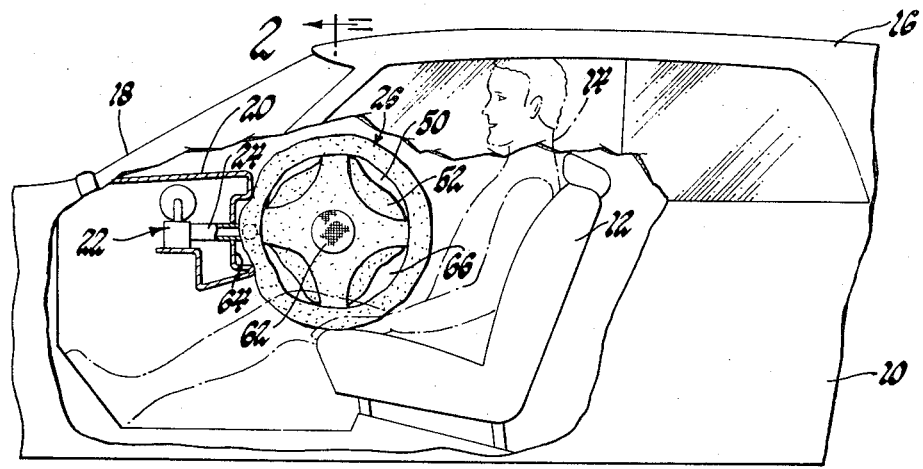
FIG. 1 is a partially broken away partial view of a vehicle body embodying an occupant restraint cushion according to this invention, with the cushion being shown inflated.

Referring now particularly to FIG. 1 of the drawings, a conventional vehicle body designated generally 10 includes a conventional front seat 12 mounted on the body for supporting a phantom line indicated occupant or passenger 14 in seated attitude. The body 10 further includes a roof structure 16, a windshield structure 18, and an instrument panel structure 20 located forwardly of the occupant 14. Housed within the instrument panel structure 20 is a conventional occupant restraint system 22, including a source of pressure fluid, such as a pressure vessel of air or nitrogen, a gas generator, or an air-augmented system. System 22 releases the pressure fluid upon command to a manifold designated 24 which communicates with an inflatable occupant restraint cushion 26 according to this invention for inflation of such cushion and location thereof between the occupant 14 and the instrument panel structure 20 and the windshield structure 18 for occupant protection purposes.

Figure 2:
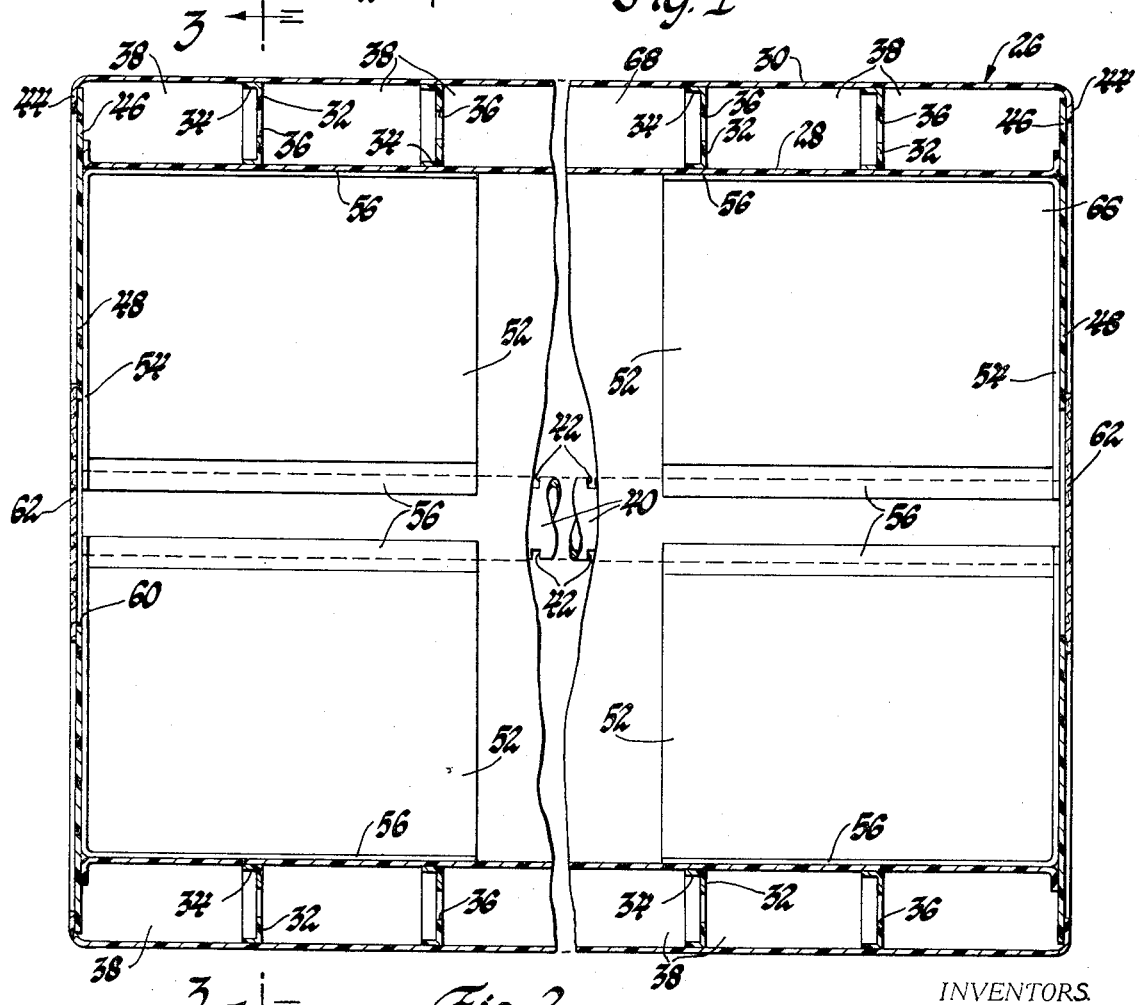
FIG. 2 is an enlarged partially broken away view taken generally along the plane indicated by line 2—2 of FIG. 1.
Figure 3:
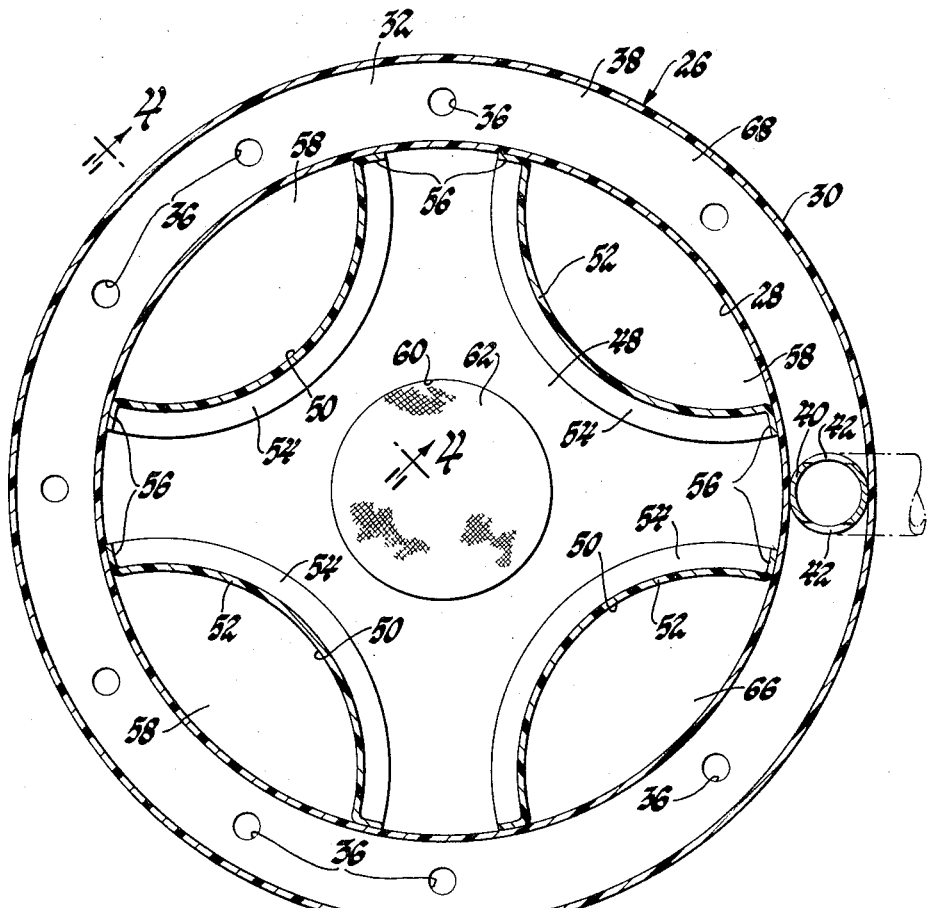
FIG. 3 is a view taken generally along the plane indicated by line 3—3 of FIG. 2.

The cushion 26 includes generally cylindrical inner and outer walls 28 and 30 located in radially spaced relationship as shown in FIGS. 2 and 3. The walls 28 and 30 are interconnected by axially spaced intermediate partitions 32 which extend circumferentially of the walls and have edge portions 34 thereof stitched or otherwise secured to each of the walls. The partitions are apertured at a number of places 36, FIG. 3, to provide for cross flow between the adjacent side-by-side pressure fluid receiving compartments or chambers 38 defined by the partitions 32 and imperforate end partitions, as will be described. A manifold or diffuser 40 extends axially of the cushion 26 between the walls 28 and 30 and is connected with the manifold 24. Manifold 40 includes diametrically opposite openings or slots 42, FIG. 3, which communicate the manifold 40 with each of the pressure fluid receiving compartments 38.

Each side edge portion 44 of the wall 30 extends over and is stitched to the outer edge portion 46 of a respective end wall 48 of the cushion. Likewise, each side edge portion of the inner wall 28 extends over and is secured to a respective edge portion 46 of walls 48. The outer edge portions 46 function as imperforate partitions and seal the end chambers or compartments 38 of the cushion against communication with the ambient atmosphere, although they can communicate with the other intermediate compartments or chambers.

Figure 4:
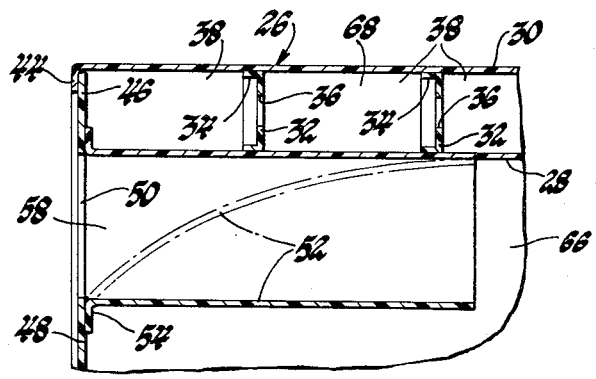
FIG. 4 is a view taken generally along the plane indicated by line 4—4 of FIG. 3.

As shown best in FIGS. 3 and 4, each end wall 48 includes four equally spaced diametrically opposite biconvex openings 50. The outer convex edge of each of the openings 50 is generally coterminous with the inner surface of wall 28. A flexible sleeve valve 52 is provided for each opening. Each valve has one edge portion 54 thereof stitched or otherwise secured to the wall 46 adjacent the inner convex edge of a respective opening 50, and lateral edge portions 56 thereof stitched or otherwise secured to wall 28 to thereby define with the wall a plurality of equidistantly spaced air or ambient atmosphere induction passages 58. Walls 48 each further include a circular aperture or opening 60 which is closed by a rupturable diaphragm or membrane 62 to provide a conventional blowout patch.

Normally the cushion 26 is stored in deflated condition within a suitable housing or recess 64 in the frontal face of the instrument panel structure 20, as shown in FIG. 1. Such housing or recess may be closed by a rupturable cover as is conventional. Upon actuation of the system 22, pressure fluid flows from the source through the manifold 24 to the manifold 40 and thence through the openings 42 to each of the pressure fluid receiving chambers or compartments 38. As the chambers 38 begin to inflate, the cushion starts to erect or take shape between the instrument panel structure 20 and the occupant 14. During such erection of taking shape, the ambient atmosphere within the passenger compartment of body 10 flows through the openings 50 and the passages 58 into the ambient atmosphere receiving chamber defined by the walls 28 and 48 to provide an ambient atmosphere inflated cushion 66 within and coaxial with the pressure fluid inflated cushion 68 defined by walls 28 and 30 and edge portions 46 of walls 48. Since the pressure within cushion 66 is less than ambient until the cushion 68 is fully inflated, the valves 52 remain open and in their position as shown in full lines in FIGS. 3 and 4 during inflation of cushion 66 so that the cushion is freely communicable with the ambient atmosphere. The valves 52 remain open when the cushions 66 and 68 are fully inflated since cushion 66 and the ambient atmosphere are both at ambient pressure.

Upon engagement the atmosphere. impact of the occupant 14 with the cushion 26, the pressure within cushion 66 increases above ambient so that the ambient atmosphere therewithin tends to flow outwardly through the passages 58. However, such outflow is blocked by the valves 52 which invert as shown in dash lines in FIG. 4 and seat against the inner surface of wall 28 to thereby close the passages 58 so that the ambient atmosphere remains entrapped within the cushion 66. When the pressure within the cushion 66 exceeds a predetermined level, the blowout diaphragms 62 rupture so that the entrapped ambient atmosphere can flow through the openings 60 to the atmosphere.

It should also be noted that blowout diaphragms may be provided between each of the compartments 38 and the cushion 66 the occupant excessive occupant or between such compartments and the ambient atmosphere within the vehicle body to permit controlled deflation of cushion 68 upon occupant impact. Such blowout diaphragms may be necessary to prevent overinflation of the cushion 68, rupture of the cushion 68 upon impact engagement thereby with the occupant 14, or to prevent excessive occupant rebound as is well known.

Thus, the cushion of this invention includes inner and outer inflatable cushions having a common or contiguous wall, with the inner cushion being inflated by ambient atmosphere and the outer cushion being inflated by pressure fluid and being divided into a number of adjacent side-by-side compartments which both communicate with each other and reinforce each other against movement upon occupant impact.

Thus, this invention provides an improved occupant restraint cushion.

We claim:

1. In combination with a vehicle body and a source of pressure fluid, an occupant restraint cushion comprising, inner and outer spaced flexible walls of generally annular shape, outer end wall means interconnecting the flexible walls adjacent the ends thereof and cooperatively defining therewith a pressure fluid inflatable outer cushion, intermediate wall means spaced relative to the end wall means and dividing the outer cushion into a plurality of longitudinally side-by-side interconnected pressure fluid receiving compartments mutually reinforcing each other against independent movement, means communicating the compartments with the pressure fluid source for inflation of the compartments to form the outer cushion to annular shape, inner end wall means secured to the inner flexible wall adjacent the ends thereof and cooperatively defining therewith an ambient atmosphere inflatable inner cushion, each inner end wall means including at least one cutout cooperatively defining with the inner flexible wall an ambient atmosphere inducing inlet, and a flexible valve member secured to each inner end wall means adjacent the cutout therein and to the inner flexible wall inwardly of the inlet and cooperating with the inner flexible wall in defining normally open ambient atmosphere induction passages communicating the inner cushion with the ambient atmosphere through the ambient atmosphere inducing inlets, the induction passages permitting the induction of ambient atmosphere into the inner cushion upon inflation of the compartments of the outer cushion and shaping of the outer cushion to annular shape, the increase in ambient pressure within the inner cushion upon occupant engagement with the outer cushion closing the flexible valve members against the inner flexible wall to thereby close the induction passages.

2. In combination with a vehicle body and a source of pressure fluid, an occupant restraint cushion comprising, inner and outer spaced flexible walls of generally annular shape, an outer imperforate end wall interconnecting the flexible walls adjacent each end thereof and cooperatively defining therewith a pressure fluid inflatable outer cushion, a plurality of intermediate walls spaced relative to the end walls and dividing the outer cushion into a plurality of longitudinally side-by-side interconnected pressure fluid receiving compartments mutually reinforcing each other against independent movement, means communicating the compartments with the pressure fluid source for inflation of the compartments to form the outer cushion to annular shape, an inner end wall secured to the inner flexible wall adjacent each end thereof and cooperatively defining therewith an ambient atmosphere inflatable inner cushion, each inner end wall including a plurality of cutouts opening to the inner flexible wall and cooperatively defining therewith an ambient atmosphere inducing inlet, and a flexible valve member secured to each inner end wall adjacent each cutout therein and to the inner flexible wall inwardly of the inlet and cooperating with the inner flexible wall in defining a plurality of normally open ambient atmosphere induction passages communicating the inner cushion with the ambient atmosphere through the ambient atmosphere inducing inlets, the induction passages permitting the induction of ambient atmosphere into the inner cushion upon inflation of the compartments of the outer cushion and shaping of the outer cushion to annular shape, the increase in ambient pressure within the inner cushion upon occupant engagement with the outer cushion closing the flexible valve members against the inner flexible wall to thereby close the induction passages.

3. In combination with a vehicle body and a source of pressure fluid, an occupant restraint cushion comprising, inner and outer spaced flexible walls of generally cylindrical shape, an outer imperforate end wall interconnecting the flexible walls adjacent each end thereof and cooperatively defining therewith a pressure fluid inflatable outer cushion, a plurality of intermediate walls spaced relative to the end walls and dividing the outer cushion into a plurality of longitudinally side-by-side interconnected pressure fluid receiving compartments mutually reinforcing each other against independent movement, means communicating the compartments with the pressure fluid source for inflation of the compartments to form the outer cushion to annular shape, an inner end wall secured to the inner flexible wall adjacent each end thereof and cooperatively defining therewith an ambient atmosphere inflatable inner cushion, each inner end wall including a plurality of arcuate cutouts opening to the inner flexible wall and cooperatively defining therewith a plurality of ambient atmosphere inducing inlets, and a flexible valve member secured to each inner end wall adjacent each cutout therein and to the inner flexible wall inwardly of the inlets and cooperating with the inner flexible wall in defining a plurality of normally open generally oval shaped ambient atmosphere induction passages communicating the inner cushion with the ambient atmosphere through the ambient atmosphere inducing inlets, the induction passages permitting the induction of ambient atmosphere into the inner cushion upon inflation of the compartments of the outer cushion and shaping of the outer cushion to annular shape, the increase in ambient pressure within the inner cushion upon occupant engagement with the outer cushion closing the flexible valve members against the inner flexible wall to thereby close the induction passages.

* * * * *